United States Patent
Kato

(10) Patent No.: US 9,705,157 B2
(45) Date of Patent: Jul. 11, 2017

(54) SULFIDE SOLID ELECTROLYTE MATERIAL, BATTERY, AND PRODUCING METHOD FOR SULFIDE SOLID ELECTROLYTE MATERIAL

(71) Applicant: TOYOTA JIDOSHA KABUSHIKI KAISHA, Toyota-shi, Aichi-ken (JP)

(72) Inventor: Yuki Kato, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/911,662

(22) PCT Filed: Sep. 10, 2014

(86) PCT No.: PCT/JP2014/073952
§ 371 (c)(1),
(2) Date: Feb. 11, 2016

(87) PCT Pub. No.: WO2015/045875
PCT Pub. Date: Apr. 2, 2015

(65) Prior Publication Data
US 2016/0197374 A1    Jul. 7, 2016

(30) Foreign Application Priority Data
Sep. 26, 2013 (JP) .................. 2013-199897

(51) Int. Cl.
| H01M 10/0562 | (2010.01) |
| C01B 17/22 | (2006.01) |
| H01M 10/052 | (2010.01) |
| H01B 1/10 | (2006.01) |

(52) U.S. Cl.
CPC ......... *H01M 10/0562* (2013.01); *C01B 17/22* (2013.01); *H01B 1/10* (2013.01); *H01M 10/052* (2013.01); *H01M 2300/0065* (2013.01); *H01M 2300/0068* (2013.01); *Y02T 10/7011* (2013.01)

(58) Field of Classification Search
CPC ........ C01B 17/22; H01B 1/10; H01M 10/052; H01M 10/0562; H01M 2300/0065; H01M 2300/0068; Y02T 10/7011
See application file for complete search history.

(56) References Cited

U.S. PATENT DOCUMENTS

| 2007/0248888 | A1 | 10/2007 | Seino et al. |
| 2013/0040208 | A1 | 2/2013 | Kanno et al. |
| 2013/0260258 | A1* | 10/2013 | Tsuchida ............... H01M 4/131 429/304 |
| 2015/0037687 | A1 | 2/2015 | Kanno et al. |

FOREIGN PATENT DOCUMENTS

| CN | 1965378 A | 5/2007 |
| JP | 2013033659 A | 2/2013 |
| JP | 2013075816 A | 4/2013 |
| WO | 2011/118801 A1 | 9/2011 |
| WO | 2013/118723 A1 | 8/2013 |

* cited by examiner

*Primary Examiner* — Patrick Ryan
*Assistant Examiner* — Ben Lewis
(74) *Attorney, Agent, or Firm* — Oliff PLC

(57) ABSTRACT

A sulfide solid electrolyte material with favorable reduction-resistance has a second structural part formed to cover a plurality of first structural parts, a first ion conductor composing the first structural part has a specific crystal phase with favorable ion conductivity, and a weight ratio γ of an Me element to a P element in the second structural part is less than 0.72.

6 Claims, 6 Drawing Sheets

OCTAHEDRON O
(SUCH AS LiS₆)

TETRAHEDRON T₁
(SUCH AS GeS₄ AND PS₄)

TETRAHEDRON T₂
(SUCH AS PS₄)

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material with favorable reduction-resistance.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has presently attracted much attention from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material is known as a solid electrolyte material, used for an all solid lithium battery. For example, in Patent Literature 1, a Li ion conductor (a sulfide solid electrolyte material) having a composition of $Li_{(4-x)}Ge_{(1-x)}P_xS_4$ is disclosed.

CITATION LIST

Patent Literature

Patent Literature 1: WO 2011/118801

SUMMARY OF INVENTION

Technical Problem

For example, the problem is that the LiGePS-based sulfide solid electrolyte material described in Patent Literature 1 is low in reduction-resistance. The present invention has been made in view of the problem, and the main object thereof is to provide a sulfide solid electrolyte material with favorable reduction-resistance.

Solution to Problem

To achieve the object described above, in the present invention, there is provided a sulfide solid electrolyte material comprising a Li element, an Me element (Me is at least one kind selected from the group consisting of Sb, Si, Ge, Sn, B, Al, Ga, In, Ti, Zr, V and Nb), a P element and a S element, characterized in that the sulfide solid electrolyte material comprises: a first structural part composed of a first ion conductor containing the Li element, the Me element, the P element and the S element; and a second structural part composed of a second ion conductor containing the Li element, the Me element, the P element and the S element, characterized in that the second structural part is formed to cover a plurality of the first structural parts; the first ion conductor has a peak at a position of $2\theta=29.58°\pm0.50°$ in X-ray diffraction measurement using a CuKα ray; does not have a peak at a position of $2\theta=27.33°\pm0.50°$ in X-ray diffraction measurement using a CuKα ray or when diffraction intensity at the peak of $2\theta=29.58°\pm0.50°$ is regarded as $I_A$ and diffraction intensity at the peak of $2\theta=27.33°\pm0.50°$ is regarded as $I_B$ in a case of having the peak at the position of $2\theta=27.33°\pm0.50°$, a value of $I_B/I_A$ is less than 0.50; and a weight ratio γ of the Me element to the P element in the second structural part is less than 0.72.

According to the present invention, the second structural part is formed to cover the first structural parts and the weight ratio γ in the second structural part is small, to allow the sulfide solid electrolyte material with favorable reduction-resistance.

In addition, in the present invention, there is provided a sulfide solid electrolyte material comprising a Li element, an Me element (Me is at least one kind selected from the group consisting of Sb, Si, Ge, Sn, B, Al, Ga, In, Ti, Zr, V and Nb), a P element and a S element, characterized in that the sulfide solid electrolyte material comprises: a first structural part composed of a first ion conductor containing the Li element, the Me element, the P element and the S element; and a second structural part composed of a second ion conductor containing the Li element, the Me element, the P element and the S element, characterized in that the second structural part is formed to cover a plurality of the first structural parts; the first ion conductor has a peak at a position of $2\theta=29.58°\pm0.50°$ in X-ray diffraction measurement using a CuKα ray; does not have a peak at a position of $2\theta=27.33°\pm0.50°$ in X-ray diffraction measurement using a CuKα ray or when diffraction intensity at the peak of $2\theta=29.58°\pm0.50°$ is regarded as $I_A$ and diffraction intensity at the peak of $2\theta=27.33°\pm0.50°$ is regarded as $I_B$ in a case of having a peak at the position of $2\theta=27.33°\pm0.50°$, a value of $I_B/I_A$ is less than 0.50; and a content of the Me element in the second structural part is smaller than a content of the Me element in the first structural part.

According to the present invention, the second structural part is formed to cover the first structural parts and the content of the Me element in the second structural part is smaller than the content of the Me element in the first structural part, to allow the sulfide solid electrolyte material with favorable reduction-resistance.

In addition, in the present invention, there is provided a battery comprising a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the sulfide solid electrolyte material described above.

According to the present invention, the use of the sulfide solid electrolyte material described above allows the battery with favorable reduction-resistance.

In addition, in the present invention, there is provided a producing method for a sulfide solid electrolyte material, the sulfide solid electrolyte material being the sulfide solid electrolyte material described above, comprising steps of: an ion conductive material synthesizing step of synthesizing an amorphized ion conductive material by mechanical milling while using a raw material composition containing a constituent of the sulfide solid electrolyte material; and a heating and quenching step of heating and quenching the amorphized ion conductive material.

According to the present invention, the amorphized ion conductive material is synthesized by mechanical milling and thereafter heated and quenched, to allow the sulfide solid electrolyte material with favorable reduction-resistance.

Advantageous Effects of invention

The present invention produces the effect such as to allow a sulfide solid electrolyte material with favorable reduction-resistance.

DESCRIPTION OF EMBODIMENTS

A sulfide solid electrolyte material, a battery and a producing method for a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into two embodiments. Then, the sulfide solid electrolyte material of the present invention is described while divided into a first embodiment and a second embodiment.

1. First Embodiment

Figure 1:
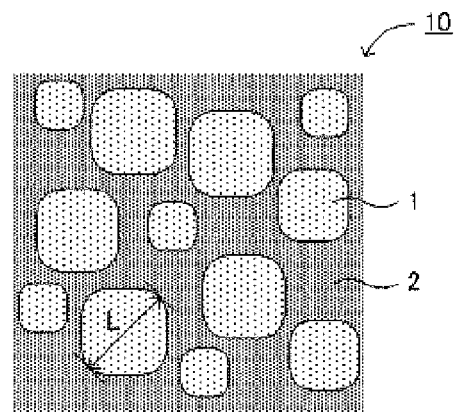
FIG. 1 is a schematic cross-sectional view showing an example of a sulfide solid electrolyte material of the present invention.

FIG. 1 is a schematic cross-sectional view showing an example of a sulfide solid electrolyte material of the first embodiment. A sulfide solid electrolyte material 10 in FIG. 1 comprises a first structural part 1 composed of a first ion conductor containing a Li element, an Me element, a P element and a S element, and a second structural part 2 composed of a second ion conductor containing a Li element, an Me element, a P element and a S element. In addition, the second structural part 2 is formed to cover a plurality of the first structural parts 1. In other words, the second structural part 2 is formed to fill up a gap in a plurality of the first structural parts 1. In addition, the first ion conductor composing the first structural part 1 has a specific peak in X-ray diffraction measurement and high ion conductivity. Also, the weight ratio γ of the Me element to the P element in the second structural part 2 is sufficiently small.

According to the first embodiment, the second structural part is formed to cover the first structural parts and the weight ratio γ in the second structural part is small, to allow the sulfide solid electrolyte material with favorable reduction-resistance. For example, in the LiGePS-based sulfide solid electrolyte material described in Patent Literature 1, the Ge element is reduced so easily as to lower reduction-resistance. In the first embodiment, the second structural part is formed to cover the first structural parts; therefore, for example, in the case where the sulfide solid electrolyte material and the anode active material are in contact with each other, the second structural part contacts with the anode active material. The Me element (such as the Ge element) may be reduced in such a contact interface; however, in the second structural part, the weight ratio γ (the weight ratio of the Me element to the P element) is small, so that the reduction of the Me element is to be inhibited. That is to say, the second structural part functions as a reduction guard layer. Thus, the improvement of reduction-resistance may be intended. Also, according to the first embodiment, the first ion conductor contains a crystal phase having a peak in the vicinity of 2θ=29.58°, so that the improvement of ion conductivity may be intended. Thus, in the first embodiment, the first structural parts with favorable ion conductivity and the second structural part with favorable reduction-resistance exist in a state of phase separation in one electrolyte system, so that the improvement of reduction-resistance and the improvement of ion conductivity may be compatible with each other.

(i) First Structural Part

The first structural part is composed of a first ion conductor containing a Li element, an Me element, a P element and a S element. The first ion conductor may contain only a Li element, an Me element, a P element and a S element, or another element further. Part of the Li element may or may not be substituted with monovalent or divalent metallic element. The substitution of part of the Li element with another element occasionally improves ion conductivity. Examples of the metallic element include at least one kind of Na, K, Mg, Ca and Zn.

Also, Me is ordinarily at least one kind selected from the group consisting of Sb, Si, Ge, Sn, B, Al, Ga, In, Ti, Zr, V and Nb, above all, preferably at least one kind selected from the group consisting of Ge, Si and Sn. Also, Me preferably contains at least Ge, Si or Sn.

Also, the first ion conductor has a peak in the vicinity of 2θ=29.58° in X-ray diffraction measurement using a CuKα ray. A crystal phase having this peak is regarded as a crystal phase A. The crystal phase A is a crystal phase with high ion conductivity. Also, the crystal phase A ordinarily has peaks at a position of 2θ=17.38°, 20.18°, 20.44°, 23.56°, 23.96°, 24.93°, 26.96°, 29.07°, 29.58°, 31.71°, 32.66° and 33.39°. Incidentally, these peak positions occasionally shift in a range of ±0.50° for the reason that a crystal lattice changes somewhat due to factors such as material composition.

Also, the first ion conductor occasionally has a peak in the vicinity of 2θ=27.33°. A crystal phase having this peak is regarded as a crystal phase B. The crystal phase B is a crystal phase with lower ion conductivity than the crystal phase A described above. Also, the crystal phase B is ordinarily conceived to have peaks of 2θ=17.46°, 18.12°, 19.99°, 22.73°, 25.72°, 27.33°, 29.16° and 29.78°. Incidentally, also these peak positions occasionally shift in a range of ±0.50°.

Also, in the case where diffraction intensity at a peak in the vicinity of 2θ=29.58° is regarded as $I_A$ and diffraction intensity at a peak in the vicinity of 2θ=27.33° is regarded as $I_B$, a value of $I_B/I_A$ is, for example, less than 0.50, preferably 0.45 or less, more preferably 0.25 or less, far more preferably 0.15 or less, particularly preferably 0.07 or less. Also, a value of $I_B/I_A$ is preferably 0. In other words, it is preferable that the first ion conductor does not have a peak in the vicinity of 2θ=27.33°.

Figure 2:
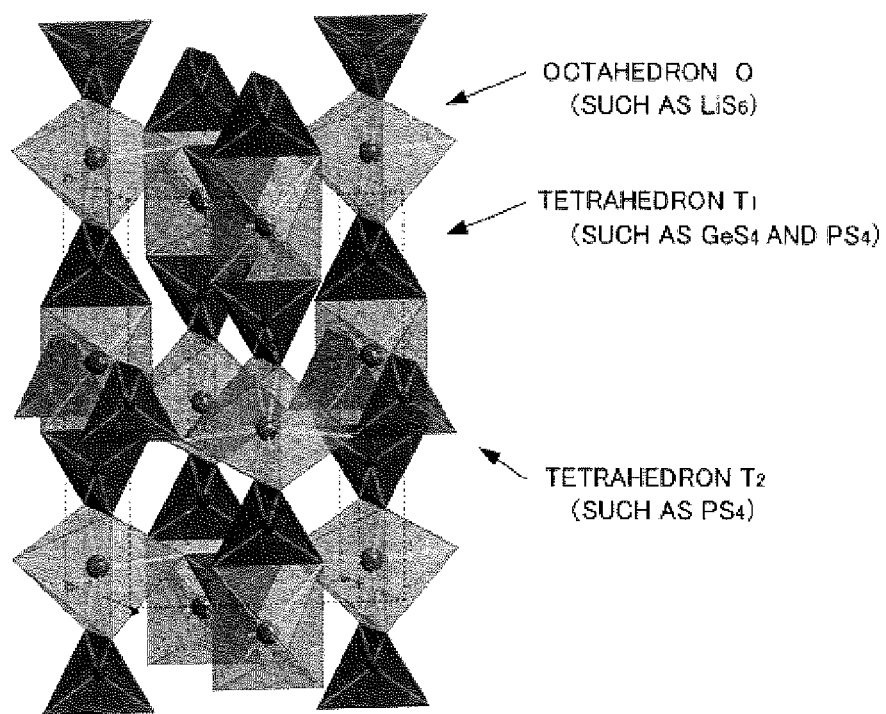
FIG. 2 is a perspective view explaining an example of a crystal structure of a crystal phase A.

Also, the crystal phase A has the following crystal structure. FIG. 2 is a perspective view explaining an example of a crystal structure of the crystal phase A. In FIG. 2, the octahedron O typically has Li as the central element, and is $LiS_6$ octahedron having six pieces of S at the corner of the octahedron. The tetrahedron $T_1$ has at least one of Me and P as the central element, and has four pieces of S at the corner of the tetrahedron; typically, $GeS_4$ tetrahedron and $PS_4$ tetrahedron, The tetrahedron $T_2$ has at least one of Me and P as the central element, and has four pieces of S at the corner of the tetrahedron; typically, $PS_4$ tetrahedron. In addition, the tetrahedron $T_1$ and the octahedron O share an edge, and the tetrahedron $T_2$ and the octahedron O share a corner.

The first ion conductor preferably contains the crystal phase A as the main body. The reason therefor is to allow the improvement of ion conductivity to be intended. The ratio of the crystal phase A in the first ion conductor is, specifically, preferably 70 wt % or more, more preferably 90 wt % or more. Incidentally, the ratio of the crystal phase A may be measured by synchrotron radiation XRD, for example. In particular, the first ion conductor preferably contains the crystal phase A as a single phase.

In the first structural part, the weight ratio of the Me element to the P element is regarded as γ. The value of γ in the first structural part may be larger than the value of γ in the second structural part, or smaller than the value of γ in the second structural part. Incidentally, a calculation method for the value of the weight ratio γ is described later.

The size of the first structural part is not particularly limited; for example, as shown in FIG. 1, in the case where the longest diameter on a cross section of the first structural part is regarded as L, the average value of L is preferably 0.4 μm or more, more preferably 0.7 μm or more. On the other hand, the average value of L is preferably 42 μm or less, for example. Incidentally, the number of samples of L is preferably larger, for example, 100 or more.

(ii) Second Structural Part

The second structural part is composed of a second ion conductor containing a Li element, an Me element, a P element and a S element. The second ion conductor may contain only a Li element, an Me element, a P element and a S element, or another element further. Also, the constituent element of the second ion conductor and the constituent element of the first ion conductor are generally the same.

Also, the second ion conductor may be crystalline or amorphous. In the case where the second ion conductor is crystalline, a crystal phase contained in the second ion conductor may be the crystal phase A, the crystal phase B, or the crystal phase A and the crystal phase B.

In the second structural part, the weight ratio of the Me element to the P element is regarded as γ. The value of γ is ordinarily less than 0.72, preferably 0.5 or less, more preferably 0.4 or less. On the other hand, the value of γ is ordinarily 0 or more. The value of the weight ratio γ may be obtained by EDX (energy-dispersive X-ray spectroscopy).

That is to say, the weight proportion of each element in the second structural part may be calculated by EDX to regard the weight ratio of the Me element to the P element as γ (γ=the weight proportion of Me/the weight proportion of P).

The ratio of the first structural part to the total of the first structural part and the second structural part is preferably larger. The reason therefor is to allow the improvement of ion conductivity to be intended. The ratio of the first structural part is, for example, preferably 20% by volume or more, more preferably within a range of 20% by volume to 90% by volume. The ratio of the first structural part may be obtained by Rietveld analysis and electron microscope observation for example.

(iii) Sulfide Solid Electrolyte Material

The composition of the sulfide solid electrolyte material of the first embodiment is not particularly limited but examples thereof include $Li_{(4-x)}Me^{IV}_{(1-x)}P_xS_4$ ($Me^{IV}$ is a tetravalent element and x satisfies 0<x<1). This composition corresponds to the composition on a tie line of $Li_3PS_4$ and $Li_4Me^{IV}S_4$. Both $Li_3PS_4$ and $Li_4Me^{IV}S_4$ correspond to an ortho-composition and have the advantage that chemical stability is high. Examples of $Me^{IV}$ include Ge, Si, Sn, Zr, Ti and Nb. Incidentally, part of $Me^{IV}$ may be substituted with trivalent or pentavalent element. Also, "x" satisfies preferably 0.4≤x, more preferably 0.5≤x, far more preferably 0.6≤x, for example. On the other hand, the "x" satisfies preferably x≤0.8, more preferably x≤0.75.

The sulfide solid electrolyte material of the first embodiment is preferably high in ion conductivity, and ion conductivity of the sulfide solid electrolyte material at 25° C. is preferably 1.0×10⁻⁴ S/cm or more, more preferably 1.0× 10⁻³ S/cm or more. Also, the shape of the sulfide solid electrolyte material of the first embodiment is not particularly limited but examples thereof include a powdery shape. In addition, the average particle diameter of the powdery sulfide solid electrolyte material is preferably within a range of 0.1 μm to 50 μm, for example.

The sulfide solid electrolyte material of the first embodiment may be used for optional uses in which ion conductivity is required. Above all, the sulfide solid electrolyte material of the first embodiment is preferably used for a battery. Also, a producing method for the sulfide solid electrolyte material of the first embodiment is described in detail in the after-mentioned 'C. Producing method for sulfide solid electrolyte material'. Also, the sulfide solid electrolyte material of the first embodiment may have characteristics of the after-mentioned second embodiment together.

2. Second Embodiment

Next, a second embodiment of a sulfide solid electrolyte material of the present invention is described. As shown in FIG. 1, similarly to the sulfide solid electrolyte material of the first embodiment, the sulfide solid electrolyte material of the second embodiment also has a first structural part 1 and a second structural part 2, and the second structural part 2 is formed to cover a plurality of the first structural parts 1. In addition, the first ion conductor composing the first structural part 1 has a specific peak in X-ray diffraction measurement and high ion conductivity. Also, the content of the Me element in the second structural part 2 is smaller than the content of the Me element in the first structural parts 1.

According to the second embodiment, the second structural part is formed to cover the first structural parts and the content of the Me element in the second structural part is smaller than the content of the Me element in the first structural part, to allow the sulfide solid electrolyte material with favorable reduction-resistance. Other effects are basically the same as the first embodiment.

Also, 'the content of the Me element in the second structural part is smaller than the content of the Me element in the first structural part' may be confirmed by EDX. That is to say, the first structural part, the interfacial region between the first structural part and the second structural part, and the second structural part may be confirmed by continuously measuring with EDX to measure the intensity of the Me element.

Incidentally, other items are basically the same as the first embodiment described above; therefore, the description herein is omitted.

B. Battery

Figure 3:
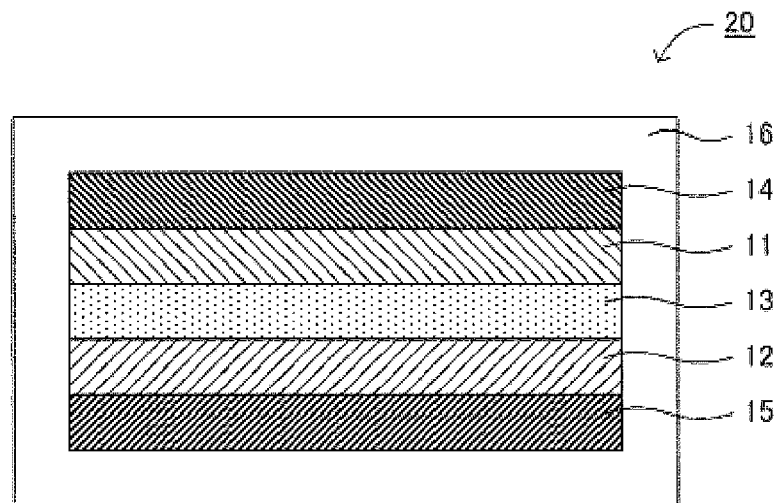
FIG. 3 is a schematic cross-sectional view showing an example of a battery of the present invention.

Next, a battery of the present invention is described. FIG. 3 is a schematic. cross-sectional view showing an example of the battery of the present invention. A battery 20 in FIG. 3 comprises a cathode active material layer 11 containing a cathode active material, an anode active material layer 12 containing an anode active material, an electrolyte layer 13 formed between the cathode active material layer 11 and the anode active material layer 12, a cathode current collector 14 for collecting the cathode active material layer 11, an anode current collector 15 for collecting the anode active material layer 12, and a battery case 16 for storing these members. In the present invention, at least one of the cathode active material layer 11, the anode active material layer 12 and the electrolyte layer 13 is greatly characterized by containing the sulfide solid electrolyte material described in the 'A. Sulfide solid electrolyte material'.

According to the present invention, the use of the sulfide solid electrolyte material described above allows the battery with favorable reduction-resistance.

The battery of the present invention is hereinafter described in each constitution.

1. Anode Active Material Layer

The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the sulfide solid electrolyte material described above. The ratio of the sulfide solid electrolyte material contained in the anode active material layer varies with kinds of a battery and is preferably, for example, within a range of 0.1% by volume to 80% by volume, above all, within a range of 1% by volume to 60% by volume, particularly, within a range of 10% by volume to 50% by volume. Also, examples of an anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. In particular, in the present invention, it is preferable that the anode active material layer contains the sulfide solid electrolyte material, and action potential (electric potential in which an insertion reaction of Li ions is caused) of the anode active material is higher than reduction potential of the sulfide solid electrolyte material.

The anode active material layer may further contain a conductive material. The addition of the conductive material allows conductivity of the anode active material layer to be improved. Examples of the conductive material include acetylene black, Ketjen Black and carbon fiber. Also, the anode active material layer may contain a binder. Examples of kinds of the binder include a fluorine-containing binder such as polyvinylidene fluoride (PVDF). Also, the thickness of the anode active material layer is preferably within a range of 0.1 μm to 1000 μm, for example.

2. Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer composed of a solid electrolyte material. The reason therefor is to allow the battery with high safety as compared with a battery using a liquid electrolyte. In addition, in the present invention, a solid electrolyte layer preferably contains the sulfide solid electrolyte material described above. The ratio of the sulfide solid electrolyte material contained in a solid electrolyte layer is preferably, for example, within a range of 10% by volume to 100% by volume, above all, within a range of 50% by volume to 100% by volume. The thickness of a solid electrolyte layer is preferably within a range of 0.1 μm to 1000 μm, for example, and within a range of 0.1 μm to 300 μm, above all. Also, examples of a method for forming a solid electrolyte layer include a method for compression-molding a solid electrolyte material. Incidentally, the electrolyte layer in the present invention may be a layer composed of a liquid electrolyte.

3. Cathode Active Material Layer

The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the sulfide solid electrolyte material described above. The ratio of the sulfide solid electrolyte material contained in the cathode active material layer varies with kinds of a battery and is preferably, for example, within a range of 0.1% by volume to 80% by volume, above all, within a range of 1% by volume to 60% by volume, particularly, within a range of 10% by volume to 50% by volume. Also, examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$. Incidentally, a conductive material and a binder used for the cathode active material layer are the same as the case of the anode active material layer described above. Also, the thickness of the cathode active material layer is preferably within a range of 0.1 μm to 1000 μm, for example.

4. Other Constitutions

The battery of the present invention comprises at least the anode active material layer, electrolyte layer and cathode active material layer described above, ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, the thickness and shape of the cathode current collector and the anode current collector are preferably selected properly in accordance with factors such as uses of a battery. Also, a battery case of a general battery may be used for a battery case used for the present invention. Examples of the battery case include a battery case made of SUS.

5. Battery

The battery of the present invention may be a primary battery or a secondary battery, preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method is a method such as to allow the battery described above, but the same method as a producing method for a general battery may be used. For example, in the case where the battery of the present invention is an all-solid state battery, examples of a producing method therefor include a method such that a material composing a cathode active material layer, a material composing a solid electrolyte layer and a material composing an anode active material layer are sequentially pressed to produce a power generating element and this power generating element is stored inside a battery case, which is crimped.

C. Producing Method for Sulfide Solid Electrolyte Material

Figure 4:
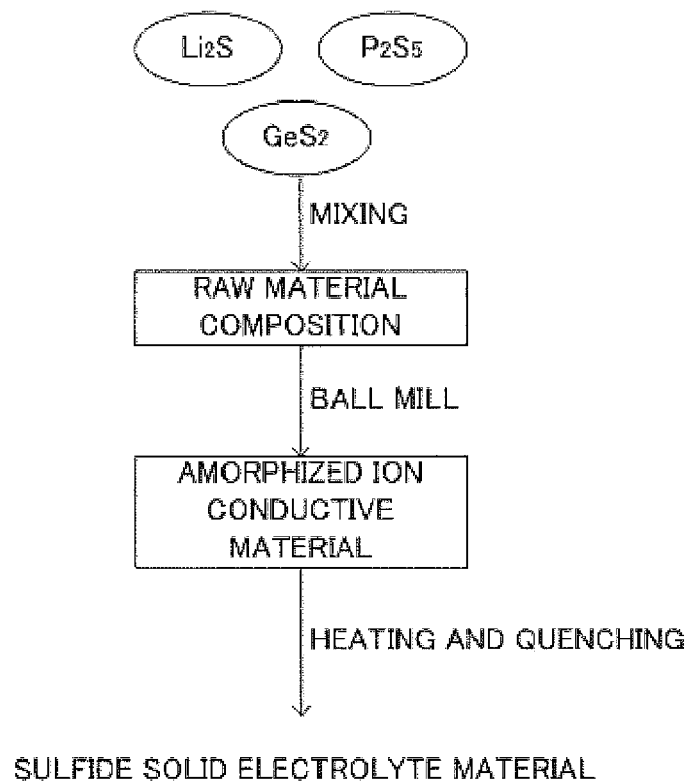
FIG. 4 is an explanatory view showing an example of a producing method for a sulfide solid electrolyte material of the present invention.

Next, a producing method for a sulfide solid electrolyte material of the present invention is described. FIG. 4 is an explanatory view showing an example of the producing method for the sulfide solid electrolyte material of the present invention. In the producing method for the sulfide solid electrolyte material in FIG. 4, first, a raw material composition is produced by mixing $Li_2S$, $P_2S_5$ and $GeS_2$. On this occasion, in order to prevent the raw material composition from deteriorating due to moisture in the air, the raw material composition is preferably produced under an inert gas atmosphere. Next, ball mill is performed for the raw material composition to obtain an amorphized ion conductive material. Next, the amorphized ion conductive material is heated and quenched to obtain a sulfide solid electrolyte material.

According to the present invention, the amorphized ion conductive material is synthesized by mechanical milling and thereafter heated and quenched, to allow the sulfide solid electrolyte material with favorable reduction-resistance. Specifically, the sulfide solid electrolyte material, in which the second structural part is formed to cover a plurality of the first structural parts, is obtained.

The reason why the sulfide solid electrolyte material, in which the second structural part is formed to cover a plurality of the first structural parts, is obtained is conceived to be as follows. First, the ion conductive material, in which the crystal phase A is easily precipitated by heating later, is obtained by mechanical milling. Next, the crystal phase A is precipitated and grown by heating the ion conductive material, so that the first structural parts are formed. On this occasion, a state of fluidizing the periphery of the first structural parts while retaining the first structural parts is obtained by adjusting the heating conditions such as heating temperature and heating time. Thus, a plurality of the first structural parts is brought to a state of being dispersed into a substrate part having fluidity. Incidentally, insufficient heating brings a possibility that the first structural parts are not brought to a state of being dispersed into the substrate part, whereas excessive heating brings a possibility that the first structural parts are melted. The quenching is performed in a state of fluidizing the periphery of the first structural parts while retaining the first structural parts, so that the substrate part having fluidity is solidified to form the second structural part. Thus, it is conceived that the sulfide solid electrolyte material, in which the second structural part is formed to cover a plurality of the first structural parts, is obtained, Also, the reason why the content of the Me element in the second structural part decreases is conceived to be that the Me element moves from the substrate part having fluidity to the first structural parts on the occasion of precipitation and growth of the first structural parts in a specific composition.

The producing method for the sulfide solid electrolyte material of the present invention is hereinafter described in each step.

1. Ion Conductive Material Synthesizing Step

The ion conductive material synthesizing step in the present invention is a step of synthesizing an amorphized ion conductive material by mechanical milling while using a raw material composition containing a constituent of the sulfide solid electrolyte material.

The raw material composition in the present invention contains at least the Li element, the Me element, the P element and the S element. Also, the raw material composition may contain the other elements described above.

Examples of a compound containing the Li element include a sulfide of Li. Specific examples of the sulfide of Li include $Li_2S$. Examples of a compound containing the Me element include a sulfide of Me. Specific examples of the sulfide of Me include $Me_2S_3$ (Me is a trivalent element such as Al, B, Ga, In and Sb), $MeS_2$ (Me is a tetravalent element such as Ge, Si, Sn, Zr, Ti and Nb), $Me_2S_5$ (Me is a pentavalent element such as V). Examples of a compound containing the P element include a sulfide of P.

Specific examples of the sulfide of P include $P_2S_5$. A compound containing the S element is not particularly limited but may be a simple substance or a sulfide. Examples of the sulfide include a sulfide of the element described above.

Mechanical milling is a method for grinding a test sample while allowing mechanical energy thereto. In the present invention, an amorphized ion conductive material is synthesized by allowing mechanical energy to the raw material composition. Examples of such mechanical milling include vibrating mill, ball mill, turbo mill, mechano-fusion and disk mill; among them, preferably vibrating mill and ball mill.

The conditions of vibrating mill are not particularly limited if the conditions are such as to allow an amorphized ion conductive material. The vibration amplitude of vibrating mill is preferably, for example, within a range of 5 mm to 15 mm, above all, within a range of 6 mm to 10 mm. The vibration frequency of vibrating mill is preferably, for example, within a range of 500 rpm to 2000 rpm, above all, within a range of 1000 rpm to 1800 rpm. The filling factor of a test sample of vibrating mill is preferably, for example, within a range of 1% by volume to 80% by volume, above all, within a range of 5% by volume to 60% by volume, particularly, within a range of 10% by volume to 50% by volume. Also, a vibrator (such as a vibrator made of alumina) is preferably used for vibrating mill.

The conditions of ball mill are not particularly limited if the conditions are such as to allow an amorphized ion conductive material. Generally, larger number of revolutions brings -higher production rate of the ion conductive material, and longer treating time brings higher conversion ratio of the raw material composition into the ion conductive material. The number of weighing table revolution's in performing planetary ball mill is preferably within a range of 200 rpm to 500 rpm, for example, and within a range of 250 rpm to 400 rpm, above all. Also, the treating time in performing planetary ball mill is preferably within a range of 1 hour to 100 hours, for example, and within a range of hour to 70 hours, above all.

Incidentally, in the present invention, the amorphized ion conductive material is preferably synthesized to bring an environment such that the crystal phase having a peak in the vicinity of 2θ=29.58° is easily precipitated.

2. Heating and Quenching Step

The heating and quenching step in the present invention is a step of heating and quenching the amorphized ion conductive material described above.

The heating temperature in the present invention is not particularly limited if the heating temperature is a temperature such as to allow, a desired sulfide solid electrolyte material. Above all, as described above, the heating temperature is preferably a temperature such as to allow a state of fluidizing the periphery of the first structural parts while retaining the first structural parts. Specifically, the heating temperature is preferably 600° C. or more, more preferably 650° C. or more. On the other hand, the heating temperature is preferably 900° C. or less, more preferably 800° C. or less. Also, the heating time is preferably adjusted properly to allow a desired sulfide solid electrolyte material. Also, heating in the present invention is preferably performed under an inert gas atmosphere or in a vacuum from the viewpoint of preventing oxidation. Examples of a heating method include a method by using a burning furnace.

On the other hand, the cooling rate during quenching is, for example, 500° C./minute or more, preferably 700° C./minute or more. Also, the cooling is preferably performed up to, for example, 100° C. or less, above all, 50° C. or less by quenching. A method for contacting a heated physical object directly or indirectly with a refrigerant is ordinarily used for the cooling method. Specific examples thereof include a method for contacting a vessel containing a heated physical object with liquid such as water and ice, and a method for contacting a heated physical object with a rotating metal roll.

The sulfide solid electrolyte material obtained by the present invention is the same as the contents described in the 'A. Sulfide solid electrolyte material'; therefore, the description herein is omitted.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMLPES

The present invention is described more specifically while showing examples hereinafter.

Example 1

Lithium sulfide ($Li_2S$, manufactured by Nippon Chemical Industrial Co., Ltd.), phosphorus dipentasulfide ($P_2S_5$, manufactured by Sigma-Aldrich Co. LLC.) and germanium sulfide ($GeS_2$, manufactured by Kojundo Chemical Lab. Co., Ltd.) were used as a starting material. These powders were mixed in a glove box under an argon atmosphere at a ratio of 0.38845 g of $Li_2S$, 0.43365 g of $P_2S_5$ and 0.17789 g of $GeS_2$ to obtain a raw material composition. Next, 1 g of the raw material composition was put in a pot made of zirconia (45 ml) together with zirconia balls (10 mm φ, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductive material ($Li_{3.25}Ge_{0.25}P_{0.75}S_4$) was obtained.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated at 700° C. for 8 hours, and thereafter projected into iced water and thereby quenched. Thus, a sulfide solid electrolyte material was obtained.

Comparative Example 1

An amorphized ion conductive material ($Li_{3.35}Ge_{0.35}P_{0.65}S_4$) was obtained in the same manner as Example 1 except for using the raw material composition obtained by mixing at a ratio of 0.39052 g of $Li_2S$, 0.36656 g of $P_2S_5$ and 0.24290 g of $GeS_2$.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated at 550° C. for 8 hours, and thereafter slowly cooled. Thus, a sulfide solid electrolyte material was obtained.

Comparative Example 2

A sulfide solid electrolyte material was obtained in the same manner as Example 1 except for modifying the heating temperature from 700° C. to 600° C. and cooling slowly not quenching.

[Evaluations]

(X-ray Diffraction Measurement)

Figure 5:
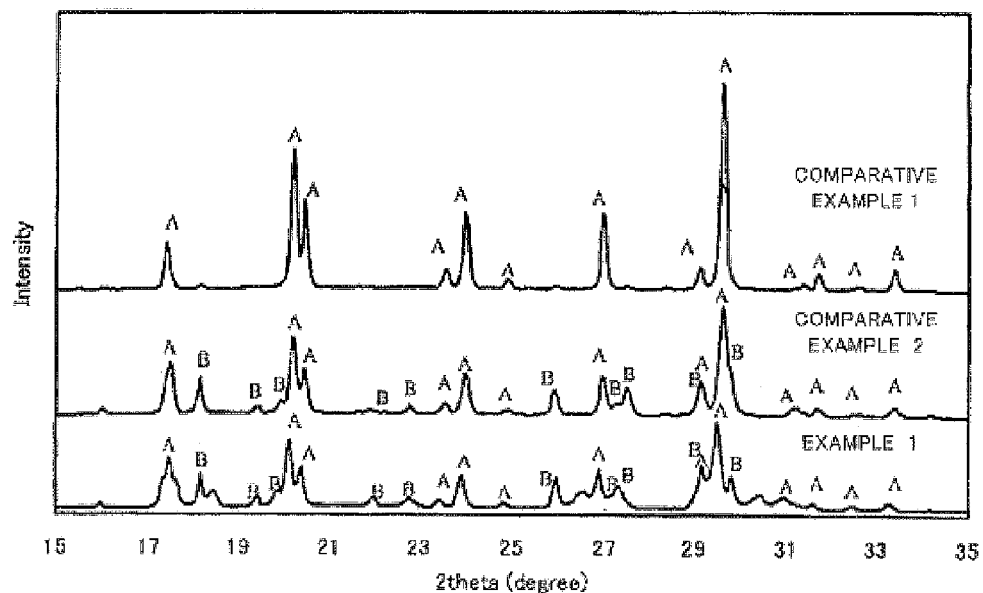
FIG. 5 is a result of XRD measurement of a sulfide solid electrolyte material each obtained in Example 1 and Comparative Examples 1 and 2.

X-ray diffraction (XRD) measurement was performed while using the sulfide solid electrolyte material each obtained in Example 1 and Comparative Examples 1 and 2. XRD measurement was performed for a powder sample under an inert atmosphere on the conditions of using a CuKα ray. The results are shown in FIG. 5. As shown in FIG. 5, in Example 1 and Comparative Example 2, the peaks of the crystal phase A and crystal phase B described above were confirmed. On the other hand, in Comparative Example 1, the peak of the crystal phase A was confirmed and the peak of the crystal phase B was not confirmed.

(SEM-EDX Measurement)

Figure 6:
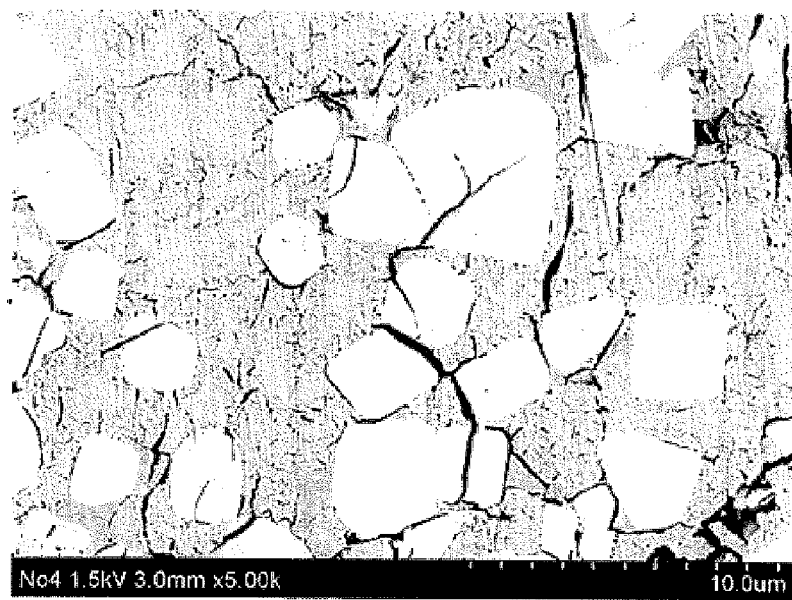
FIG. 6 is a result of SEM measurement of a sulfide solid electrolyte material obtained in Example 1.
Figure 7:
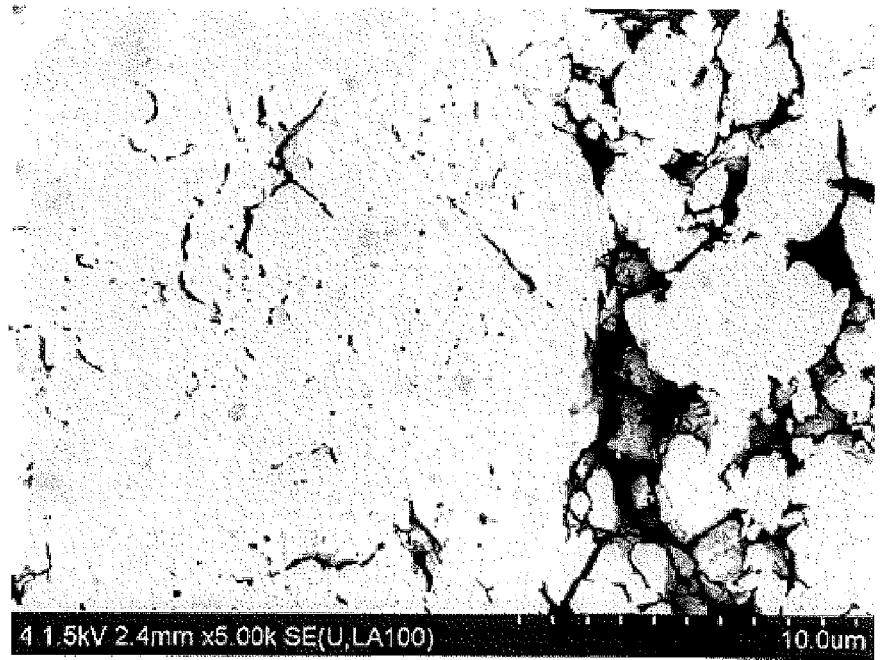
FIG. 7 is a result of SEM measurement of a sulfide solid electrolyte material obtained in Comparative Example 1.
Figure 8:
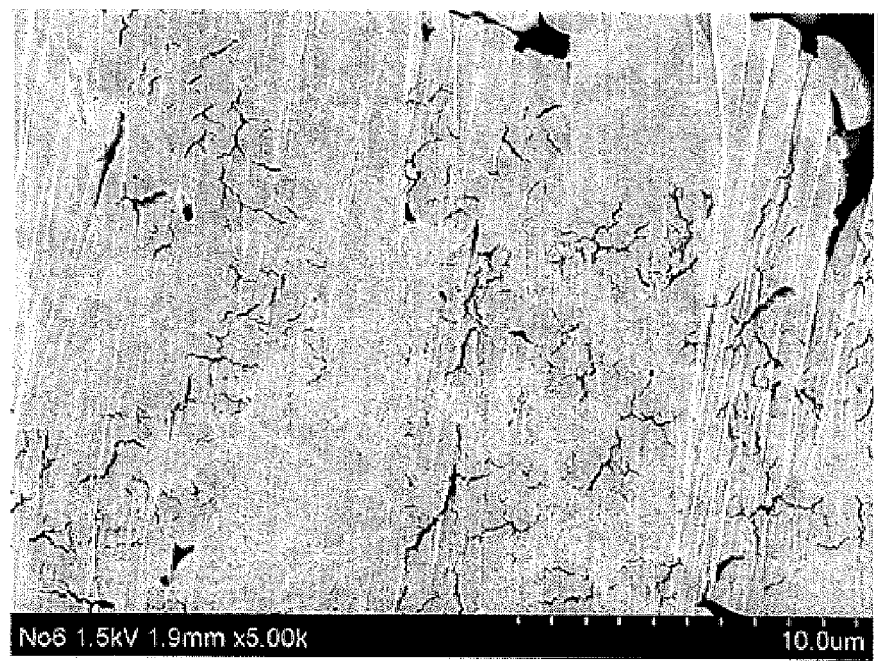
FIG. 8 is a result of SEM measurement of a sulfide solid electrolyte material obtained in Comparative Example 2.

The cross section of the sulfide solid electrolyte material each obtained in Example 1 and Comparative Examples 1 and 2 was observed by SEM. The test sample was produced by a cross section polisher. The results are shown in FIGS. 6 to 8. As shown in FIG. 6, in Example 1, it was confirmed that a high-brightness region and a low-brightness region were separated. Also, the low-brightness region (the second structural part) was formed to cover the geometric high-brightness region (the first structural part). Incidentally, as a result of electron diffraction by TEM, it was confirmed that the high-brightness region contained the first ion conductor having the crystal phase A and the low-brightness region contained the second ion conductor having the crystal phase B.

On the other hand, as shown in FIG. 7, in Comparative Example 1, it was confirmed that a distribution was not observed in the cross-sectional structure, which had a uniform composition distribution. Also, as shown in FIG. 8, in Comparative Example 2, it was confirmed that the high-brightness region and the low-brightness region were separated though contrast difference was low as compared with Example 1. However, as Example 1, the low-brightness region was not formed to cover the high-brightness region, and the state was such that the high-brightness region and the low-brightness region were tangled.

Also, the weight ratio γ of the Ge element to the P element in the second ion conductor was measured by EDX. As a result, Example 1 offered γ=0.38 and Comparative Example 2 offered γ=0.72.

(Evaluation of Reduction-resistance)

The reduction-resistance was evaluated while using the sulfide solid electrolyte material each obtained in Example 1 and Comparative Examples 1 and 2. Specifically, the electrical quantity consumed in decomposing the sulfide solid electrolyte material was measured. First, the obtained sulfide solid electrolyte material was weighed by 100 mg, put in a cylinder made of macole, and pressed at 1 ton/cm$^2$ to form a separator layer. Next, SUS powder and the obtained sulfide solid electrolyte material were mixed at a weight ratio of 80:20. Disposed was 12 mg of the obtained powder on the separator layer and pressed at 4 ton/cm$^2$ to form a working electrode. Lastly, an LiIn foil (a reference electrode) was disposed on the surface of the separator layer on the opposite side to the working electrode, pressed at 4 ton/cm$^2$, and bolted at 6 Ncm, thereby obtaining an evaluation cell.

Figure 9A:
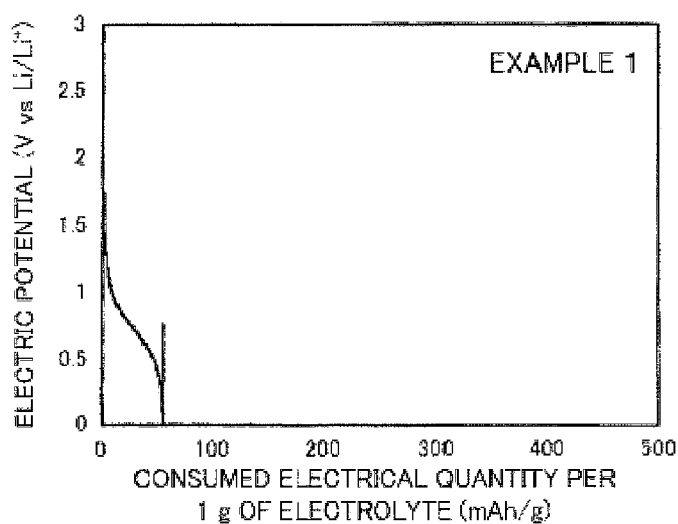
FIGS. 9A to 9C are each a result of reduction-resistance evaluation of a sulfide solid electrolyte material each obtained in Example 1 and Comparative Examples 1 and 2.
Figure 9B:
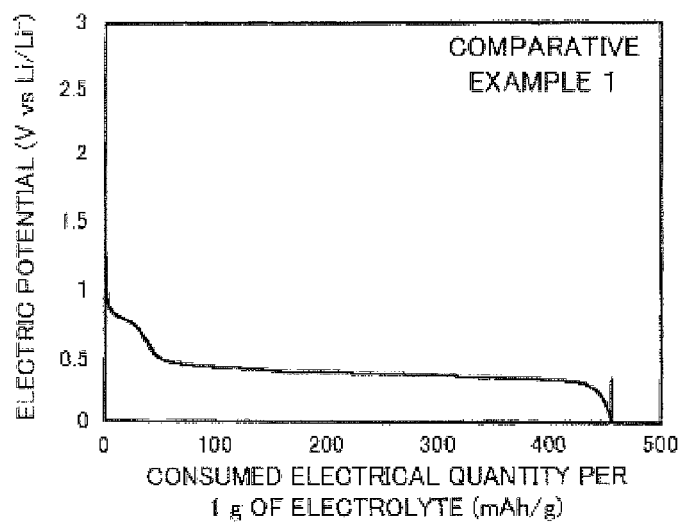
Figure 9C:
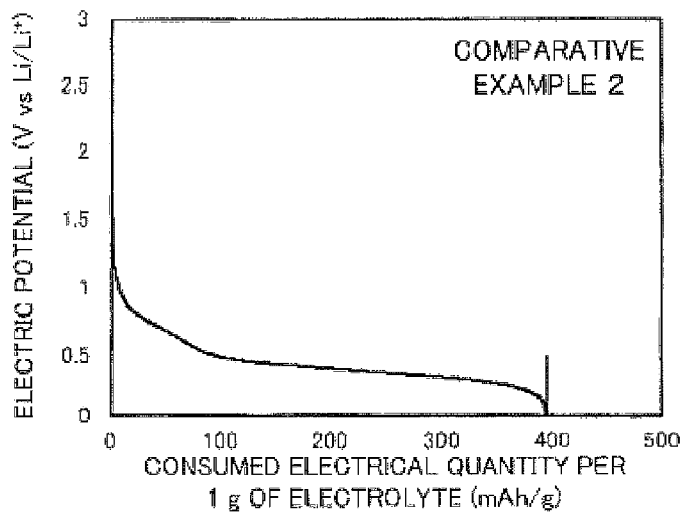
Figure 10:
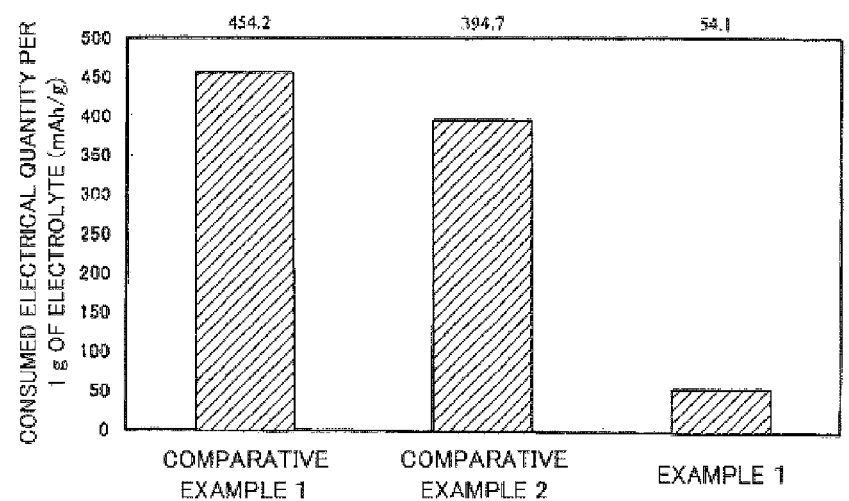
FIG. 10 is a result of reduction-resistance evaluation of a sulfide solid electrolyte material each obtained in Example 1 and Comparative Examples 1 and 2.

The electric potential of the working electrode was lowered up to −0.62 V (vs LiIn) at a current density of 0.01 mA/cm$^2$ with respect to the obtained evaluation cell, and an electrical quantity a point of time when the electric potential of the working electrode reached −0.62 V was regarded as the electrical quantity consumed in decomposing the sulfide solid electrolyte material. The results are shown in FIGS. 9 and 10. Incidentally, in FIGS. 9A to 9C, the measured potential is modified into an electric potential based on Li/Li$^+$ by adding 0.62 V thereto. As shown in FIGS. 9 and 10, in Comparative Example 1 having the crystal phase A and not having the crystal phase B, the consumed electrical quantity was the largest. Also, in Comparative Example 2, reductive decomposition may not be sufficiently inhibited though the consumed electrical quantity was lower than Comparative Example 1. The reason therefor is conceived to be that the value of γ in the low-brightness region was large (the amount of Ge contained in the second ion conductor was large) and the low-brightness region was not formed to cover the high-brightness region. On the contrary, in Example 1, the consumed electrical quantity became remarkably lower than Comparative Examples 1 and 2. Thus, it was confirmed that the sulfide solid electrolyte material obtained in Example 1 was favorable in reduction-resistance.

REFERENCE SIGNS LIST

1 . . . first structural part
2 . . . second structural part
10 . . . sulfide solid electrolyte material
11 . . . cathode active material layer
12 . . . anode active material layer
13 . . . electrolyte layer
14 . . . cathode current collector
15 . . . anode current collector
16 . . . battery case
20 . . . battery

The invention claimed is:

1. A sulfide solid electrolyte material comprising a Li element, an Me element (Me is at least one kind selected from the group consisting of Sb, Si, Ge, Sn, B, Al, Ga, In, Ti, Zr, V and Nb), a P element and a S element, wherein the sulfide solid electrolyte material comprises:
   a first structural part composed of a first ion conductor containing the Li element, the Me element, the P element and the S element; and
   a second structural part composed of a second ion conductor containing the Li element, the Me element, the P element and the S element,
   wherein the second structural part is formed to cover a plurality of the first structural parts;
   the first ion conductor has a peak at a position of 2θ=29.58°±0.50° in X-ray diffraction measurement using a CuKα ray; does not have a peak at a position of 2θ=27.33°±0.50° in X-ray diffraction measurement using a CuKα ray or when diffraction intensity at the peak of 2θ=29.58°±0.50° is regarded as $I_A$ and diffraction intensity at the peak of 2θ=27.33°±0.50° is regarded as $I_B$ in a case of having the peak at the position of 2θ=27.33°±0.50°, a value of $I_B/I_A$ is less than 0.50; and
   a weight ratio γ of the Me element to the P element in the second structural part is less than 0.72.

2. A battery comprising a cathode active material layer containing a cathode active material, an anode active material layer containing an anode active material, and an electrolyte layer formed between the cathode active material layer and the anode active material layer,
   wherein at least one of the cathode active material layer, the anode active material layer and the electrolyte layer contains the sulfide solid electrolyte material according to claim 1.

3. A producing method for a sulfide solid electrolyte material, the sulfide solid electrolyte material being the sulfide solid electrolyte material according to claim 1, comprising steps of:
   an ion conductive material synthesizing step of synthesizing an amorphized ion conductive material by mechanical milling while using a raw material composition containing a constituent of the sulfide solid electrolyte material; and
   a heating and quenching step of heating and quenching the amorphized ion conductive material,
   wherein a heating temperature in the heating and quenching step is within the range of 650° C. to 800° C.

4. A sulfide solid electrolyte material comprising a Li element, an Me element (Me is at least one kind selected from the group consisting of Sb, Si, Ge, Sn, B, Al, Ga, In, Ti, Zr, V and Nb), a P element and a S element, wherein the sulfide solid electrolyte material comprises:
   a first structural part composed of a first ion conductor containing the Li element, the Me element, the P element and the S element; and
   a second structural part composed of a second ion conductor containing the Li element, the Me element, the P element and the S element,
   wherein the second structural part is formed to cover a plurality of the first structural parts;
   the first ion conductor has a peak at a position of 2θ=29.58°±0.50° in X-ray diffraction measurement using a CuKα ray; does not have a peak at a position of 2θ=27.33°±0.50° in X-ray diffraction measurement using a CuKα ray or when diffraction intensity at the peak of 2θ=29.58°±0.50° is regarded as $I_A$ and diffraction intensity at the peak of 2θ=27.33°±0.50° is regarded as $I_B$ in a case of having the peak at the position of 2θ=27.33°±0.50°, a value of $I_B/I_A$ is less than 0.50; and a content of the Me element in the second structural part is smaller than a content of the Me element in the first structural part.

5. A battery comprising a cathode active material layer containing a cathode active material, an anode active material layer containing an anode active material, and an electrolyte layer formed between the cathode active material layer and the anode active material layer,
 wherein at least one of the cathode active material layer, the anode active material layer and the electrolyte layer contains the sulfide solid electrolyte material according to claim 4.

6. A producing method for a sulfide solid electrolyte material, the sulfide solid electrolyte material being the sulfide solid electrolyte material according to claim 4, comprising steps of:
 an ion conductive material synthesizing step of synthesizing an amorphized ion conductive material by mechanical milling while using a raw material composition containing a constituent of the sulfide solid electrolyte material; and
 a heating and quenching step of heating and quenching the amorphized ion conductive material,
 wherein a heating temperature in the heating and quenching step is within the range of 650° C. to 800° C.

* * * * *